Oct. 19, 1965   R. G. PIETY ETAL   3,213,412
CORRECTION OF SEISMIC RECORDS
Filed July 11, 1961   5 Sheets-Sheet 1
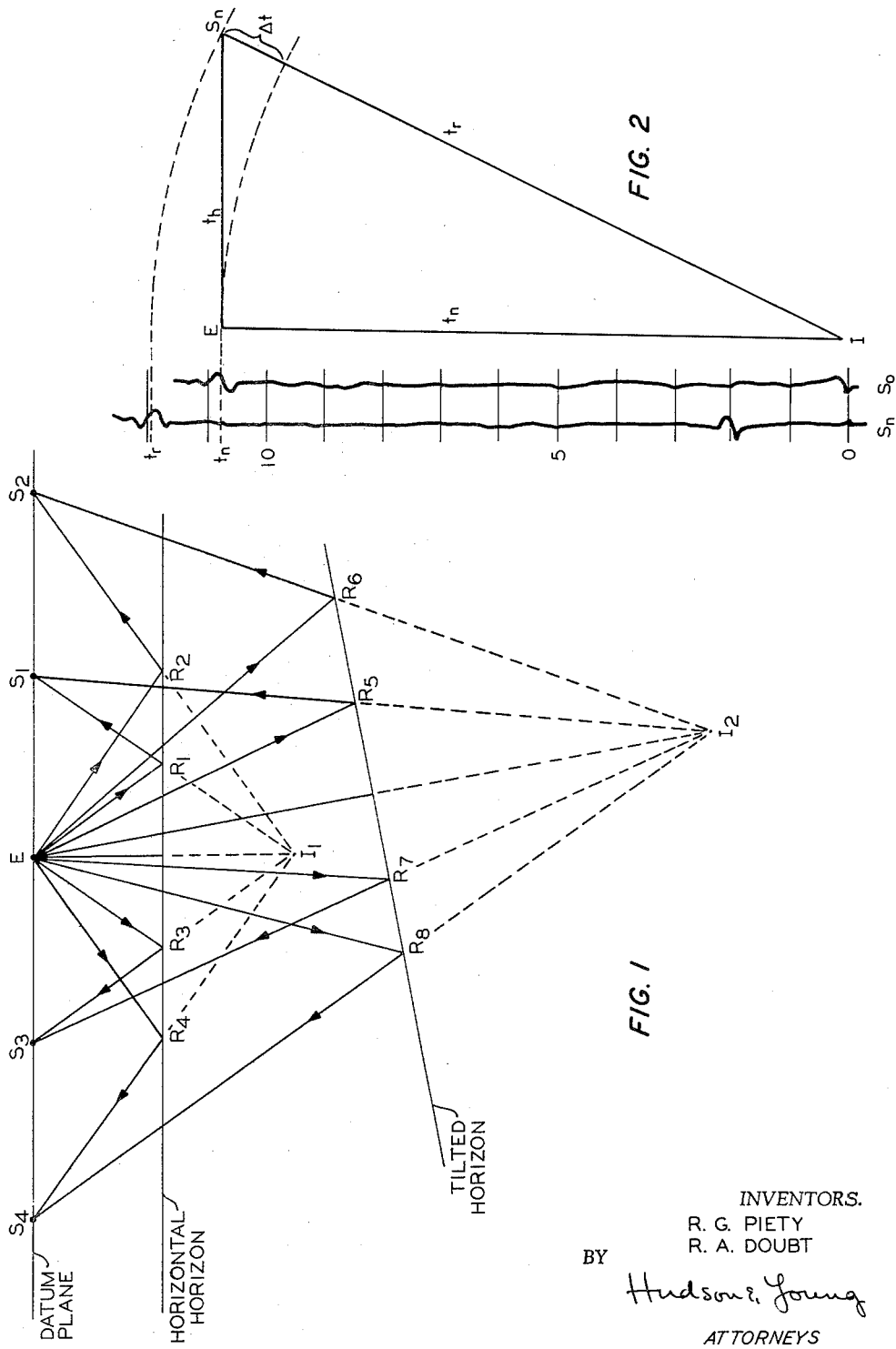
INVENTORS.
R. G. PIETY
R. A. DOUBT
BY
Hudson E. Young
ATTORNEYS

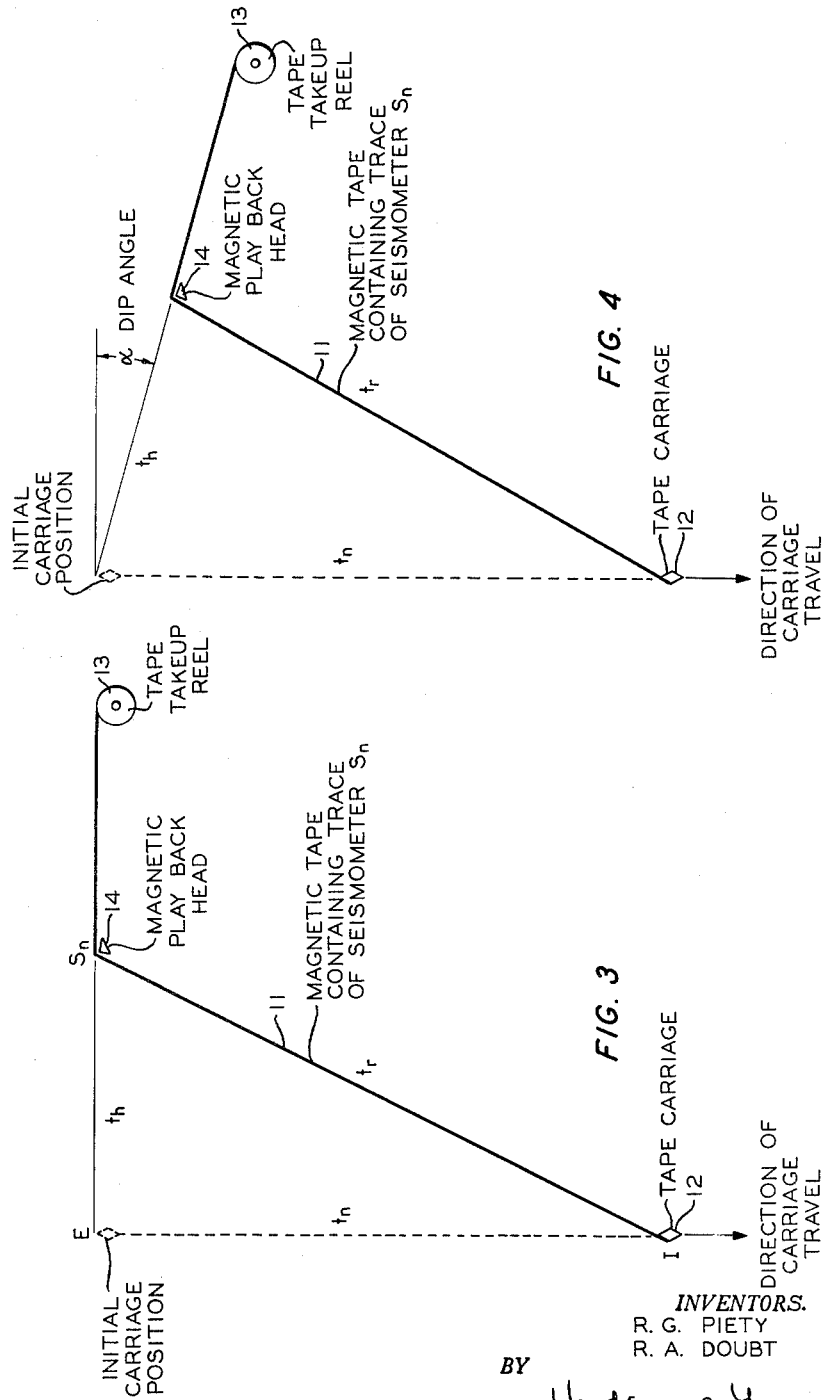

Oct. 19, 1965    R. G. PIETY ETAL    3,213,412
CORRECTION OF SEISMIC RECORDS

Filed July 11, 1961

INVENTORS.
R. G. PIETY
R. A. DOUBT
BY
Hudson & Young
ATTORNEYS

Oct. 19, 1965   R. G. PIETY ETAL   3,213,412
CORRECTION OF SEISMIC RECORDS
Filed July 11, 1961   5 Sheets-Sheet 5

INVENTORS.
R. G. PIETY
R. A. DOUBT
BY
Hudson E. Young
ATTORNEYS

_United States Patent Office_

3,213,412
Patented Oct. 19, 1965

3,213,412
CORRECTION OF SEISMIC RECORDS
Raymond G. Piety and Ralph A. Doubt, both of Bartlesville, Okla., assignors to Phillips Petroleum Company, a corporation of Delaware
Filed July 11, 1961, Ser. No. 123,231
5 Claims. (Cl. 340—15.5)

This invention relates to reflection seismology, whereby seismograph records are produced and geophysical data interpreted therefrom. More particularly, it relates to a method and apparatus for correcting such seismographic records by a novel electromechanical analog of the "time triangle" familiar to geophysicists, whereby the arrival times of recorded reflection events are shifted into time alignment on each trace of the record in a controlled manner.

In seismic prospecting by the reflection method, elastic waves are artificially produced at a first point at or near the earth's surface. This is customarily done by detonating a charge of dynamite in a shallow borehole, called a shotpoint. The elastic waves propagate downwardly and outwardly into the subsurface formations and are reflected by various discontinuities in the earth's structure to a plurality of second points at the earth's surface where the reflected waves are detected by a plurality of seismometers disposed in a predetermined geometric array in spaced relationship from the common source of disturbance or shotpoint. The seismometers convert the detected, reflected elastic waves into corresponding electrical seismic signals which are amplified and recorded.

The seismic signals are usually recorded in the form of reproducible traces, either photographically or, more commonly today, magnetically on magnetic tape. A seismograph record (or seismogram) will usually consist of a plurality of traces longitudinally arranged in parallel relationship, each trace representing the seismic signals detected by a single seismometer. The seismogram is also provided with suitable timing marks in the form of another trace so when the seismogram is later examined the time required for the elastic waves to travel downwardly from the shotpoint and be reflected back to the seismometer stations can be determined.

The seismograms are examined and interpreted to locate and determine the nature of geologic structures beneath the earth's surface, such as the depth and dip of subterranean reflecting beds. The geophysical data recorded on a seismogram is of enormous complexity, which makes it difficult—and sometimes impossible—to resolve the recorded information and interpret the same. In particular, it is a difficult task to identify any particular wave on the seismogram as a reflection from a subsurface horizon.

In order to interpret the geophysical data of the seismogram, it first becomes necessary to correct the time alignment of the individual traces. The times of arrival of the elastic waves from the shotpoint to the different seismometers vary with the horizontal or surface distance between seismometers. This variation or difference in time across the seismogram is referred to as normal moveout (sometimes as angularity of path) and is a dynamic error which tends to obscure alignments of corresponding signal portions along traces. The normal moveout time varies non-linearly in magnitude during the recording of these seismic signals. The magnitude is the largest right after the detonation of the shot, when the differences in distances of the elastic wave travel paths are largest. The magnitude decreases as the differences in travel paths decreases for successively deeper reflecting horizons. The exact manner in which the normal moveout time varies as a function of time after the initial seismic disturbances will, of course, depend on the spacing of the different seismometers and the particular velocity function of the surveyed area.

A second time alignment correction which must be made is due to topographic effects such as variations in the elevation of the shotpoint and seismometers and the existence of a weathered layer at the earth's surface. These effects introduce constant static errors in the time alignment of seismic events on the seismogram traces.

A number of procedures have been proposed, patented, or used in the past for correcting time alignment errors due to normal moveout, elevational, and weathered layer effects. While some of these prior art procedures have worked satisfactorily in some areas, others are not practical because they decrease the signal-to-noise ratio, or they require a number of very time-consuming corrective trace reproductions, while others are not able to cope with the non-linearity of the normal moveout.

Accordingly, an object of our invention is to improve the reflection seismology technique by increasing the readability of seismographic records. Another object is to correct seismographic records by an improved technique which is rapid, accurate, and relatively simple. Another object is to provide improved method and apparatus for correcting time variations in seismographic traces due to normal moveout, elevational effects, and weathered layer effects. Another object is to provide an improved method and apparatus for correcting such seismographic records by a novel electromechanical analog of the "time triangle" familiar to geophysicists, whereby the arrival times of recorded reflection events are shifted into time alignment on each trace of the record in a controlled manner. Further objects and advantages of this invention will become apparent to those skilled in the art from the following discussion, appended claims, and accompanying drawing in which:

FIGURE 1 is a schematic view of terrain in cross section showing the path geometry of elastic waves as they travel from shotpoint and are reflected back to seismometers;

FIGURE 2 is a view showing the pictorial relationship between the traces of a seismogram and the time triangle analog;

Figure 5:
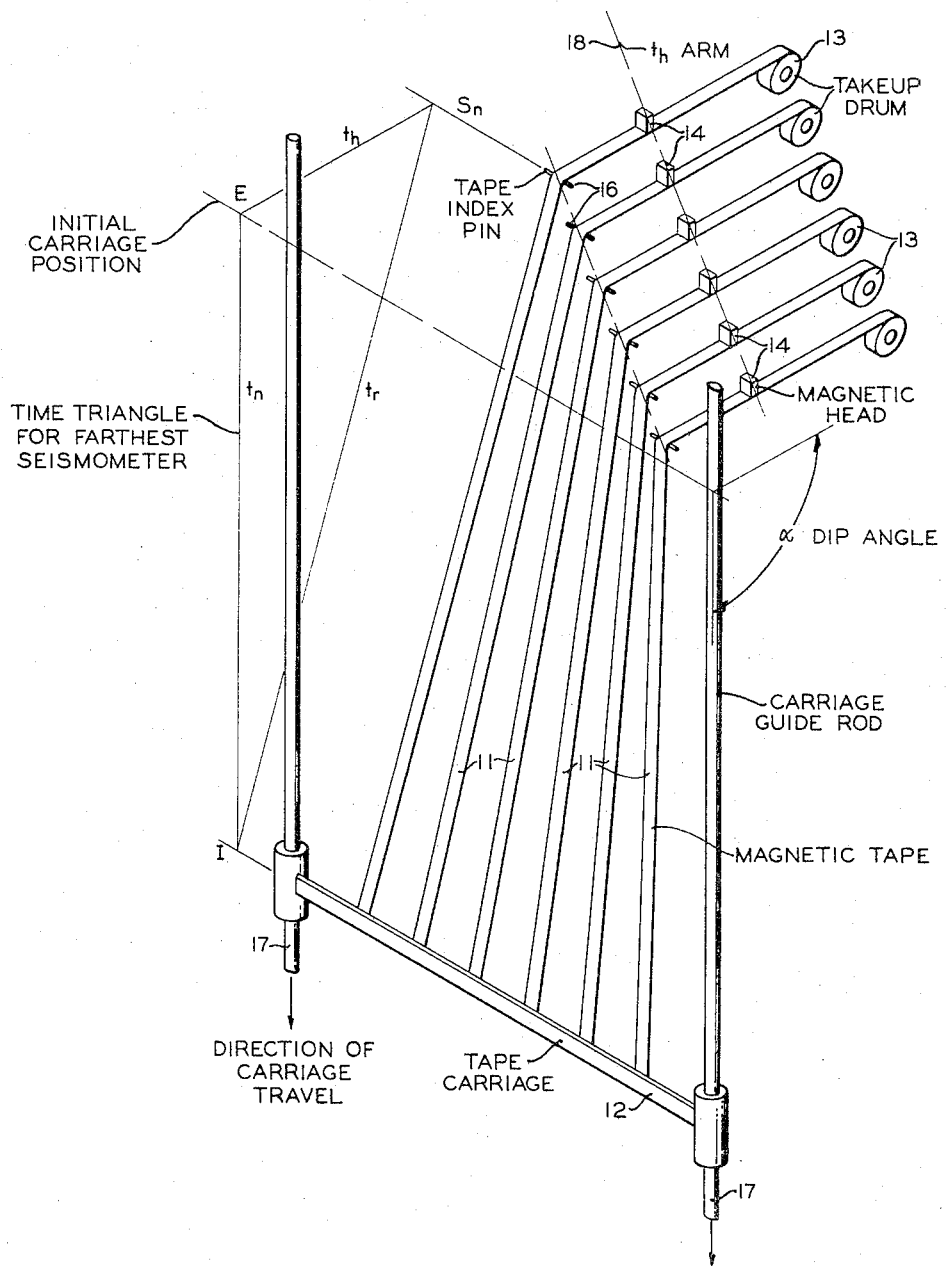
Figure 6:
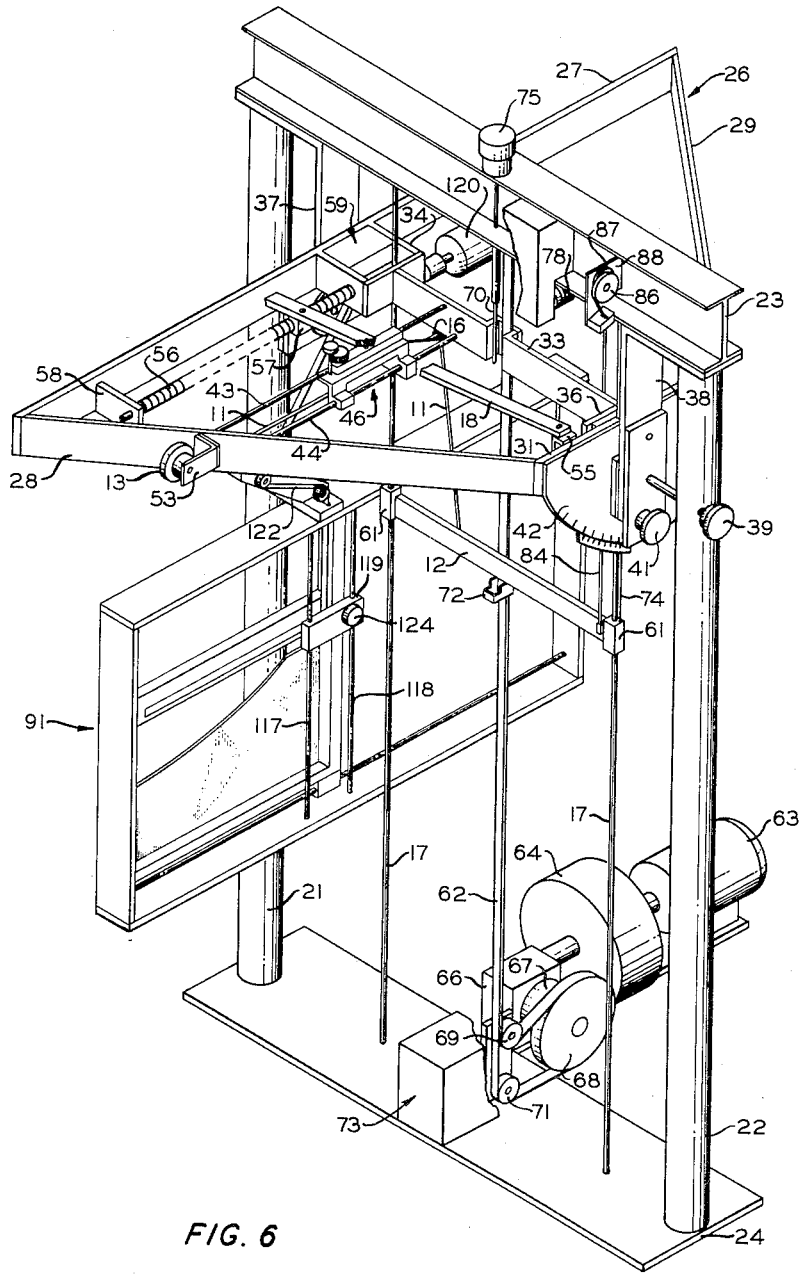
Figure 8:
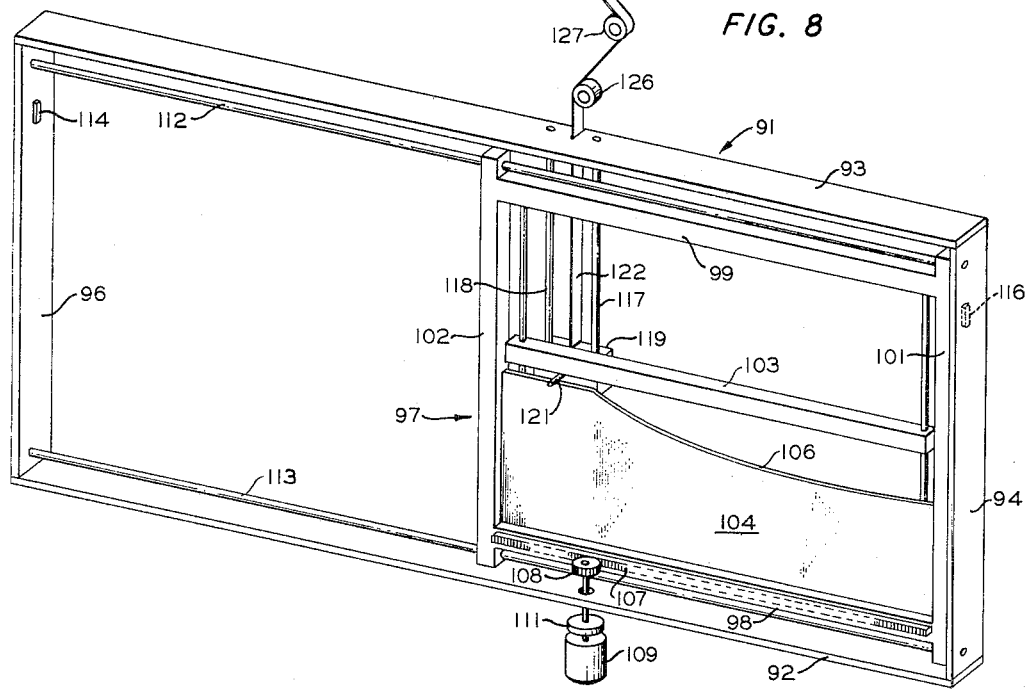
Figure 7:
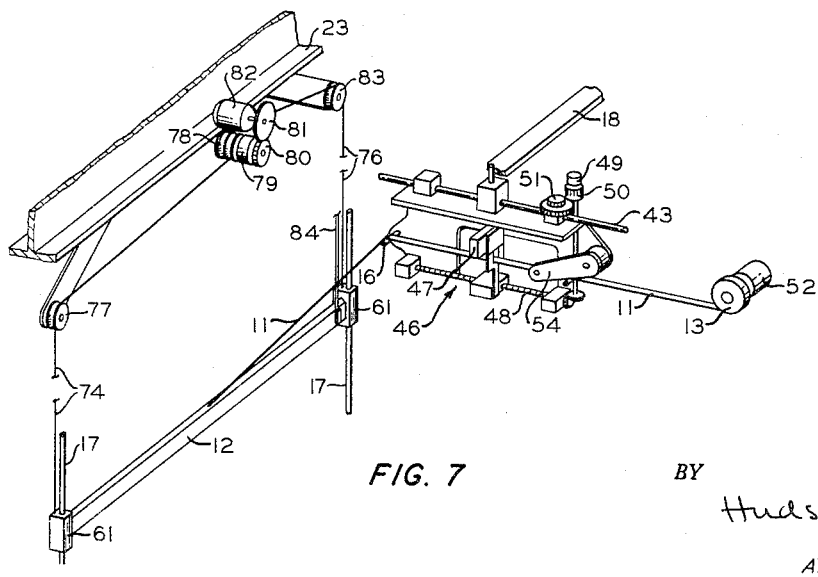

FIGURES 3 and 4 schematically illustrate mechanical analogs of the time triangle;

FIGURE 5 is a schematic view of a multi-channel mechanical analog corrector;

FIGURE 6 is an isometric view of the preferred embodiment of the novel mechanical analog corrector of this invention; and FIGURES 7 and 8 are views showing in detail various parts of the apparatus of FIGURE 6.

Before describing the instant invention, it is believed wise to briefly describe the elementary principles of reflection seismology.

The basis for the reflection seismology technique is shown in the space diagram of FIGURE 1. For purpose of brevity, let it be assumed that the datum plane coincides with the surface of the earth. The ray paths generated at shotpoint E are reflected from subsurface horizons. Two such subsurface horizons are shown in FIGURE 1, one of which is horizontal and the other at an angle or tilted with respect to the earth's surface. An array of seismometers, such as $S_1$, $S_2$, $S_3$, and $S_4$, at the earth's surface and spaced in a predetermined manner from shotpoint E, detect the arrival of the reflected waves and convert the same into electrical signals which are amplified and recorded on seismograms. The reflected sound waves appear to come from points $I_1$ and $I_2$, known as image points. Each image point lies as far below the particular reflecting horizon as the shotpoint E is above the horizon and is located along a line normal to the reflecting horizon and intersecting the shotpoint. Any ray path $ER_nS_n$, where $S_n$ is the position of any seismometer and $R_n$ any point of reflection, is equivalent to path $I_nR_nS_n$, where $I_n$ is an image point for the horizon in which $R_n$ lies. For example, ray path $ER_1S_1$ is equivalent to path $I_1R_1S_1$, and ray path $ER_8S_4$ is equivalent to path $I_2R_8S_4$. In the case of the horizontal horizon, it is evident that $ER_2S_2$ (or $I_2R_2S_2$) is greater than $ER_1S_1$ (or $I_1R_1S_1$) so that when a reflected wave front from the horizontal horizon reaches seismometer $S_1$ the wave front will be short of seismometer $S_2$. In the case of the tilted or dipping horizon, it is evident that $ER_8S_4$ (or $I_2R_8S_4$) is greater than $ER_6S_2$ (or $I_2R_6S_2$) so that when a reflected wave front from the tilted horizon reaches seismometer $S_2$ on one side of the shotpoint E, the wave front is still short of the corresponding seismometer $S_4$ on the other side of the shotpoint. The difference in reflection times is called normal moveout, and it increases both with the degree of tilt or dip and the distance between the end seismometers of the seismometer array or spread.

The space diagram of FIGURE 1 can be converted into an analog diagram of time, as shown in FIGURE 2. Since the dimensions of the space triangle of FIGURE 1 are distance, division of each of the triangle legs by a velocity parameter converts the triangle dimensions to time. The average velocity $v$ over the ray path is used for the velocity parameter. This conversion to time units produces the time triangle of FIGURE 2 with sides $t_h$, $t_r$, and $t_n$, where $t_h$ is the horizontal time from shotpoint E to seismometer station $S_n$, $t_r$ is the time from shotpoint E to reflector to seismometer $S_n$ (or from image I to seismometer $S_n$), and $t_n$ is the normal time from shotpoint E to reflector and back to shotpoint.

FIGURE 2 also shows the pictorial relationship between the time of arrival and the traces of a seismogram recorded by a seismometer $S_o$ at a shotpoint E and seismometer $S_n$ located at a known distance from the shotpoint. The difference in arrival times of a seismic event at a seismometer $S_o$ and at seismometer $S_n$ is equal to $\Delta t$, the extra time required for the wave to travel from shotpoint E to reflector to seismometer $S_n$. This extra time is the normal moveout time correction necessary to convert reflection time $t_r$ to normal time $t_n$.

There is an important difference in the dynamic time dependent properties of the space triangle of FIGURE 1 and the time triangle of FIGURE 2. In the space triangle of FIGURE 1, the leg $ES_n$ (shotpoint to seismometer distance) does not vary with time. However, the leg $EI_n$ (shotpoint to image distance) and $I_nS_n$ (image to seismometer distance) both increase in length from the shot instant in a manner determined by the change in average velocity $v$. This increase is uniform with time only if the average velocity is constant. The legs of the time triangle of FIGURE 2 behave somewhat differently. Since average velocity is a determining factor in the length of each leg of the time triangle, all three legs change with record time. The leg $t_h$ usually decreases with record time since the spatial dimension $ES_n$ is constant and $v$ usually increases. The leg $t_n$ represents elapsed time from the shot instant and increases uniformly. The leg $t_r$ must increase in such a way as to maintain the time triangle closed.

According to our invention, the normal movement is corrected by a novel electromechanical analog of the time triangle of FIGURE 2. Such an analog is shown schematically in FIGURE 3. A magnetic tape 11 containing the trace of one seismometer $S_n$ is attached at its initial time end to a tape carriage 12 which is adapted to move at a constant speed in one direction. The other end of the tape 11 is attached to a tape takeup drum 13. Since the tap 11 has a dimension in time units, it can represent the leg $t_r$ of the time triangle. As the tape carriage 12 starts at the indicated initial position and travels uniformly downward, the tape will move across the magnetic playback head 14 allowing the seismic data to be reproduced. The resulting non-uniform tape velocity across the playback head 14 will cause the time of playout of reflection events to be equivalent to normal time $t_n$ rather than reflection time $t_r$ since the location of the playback head 14 and tape 11 are such that reproduced events are advanced by an amount equal to $\Delta t$. Consequently, the normal moveout time correction $\Delta t$ is accomplished directly in playback operation.

Since not all reflection events require the same value of $t_n$, this side of the time triangle must vary in length as the $t_n$ side increases uniformly. The quantity $t_h$ must be maintained proportional to the inverse of average velocity $v$, the constant of proportionality being the shotpoint-to-seismometer distance. The average velocity as a function of normal time must be known or assumed. In most situations the average velocity increases the record time and the parameter $t_h$ decreases with increase in normal time $t_n$.

When the reflecting horizon is tilted or dipped, an appropriate change in the time triangle must be made to maintain the mechanical analog. This is accomplished by changing the angle between the $t_h$ and $t_n$ legs of the triangle from 90°. The amount of change is equal to the dip angle $\alpha$. FIGURE 4 illustrates the mechanical analog configuration required for a dip angle $\alpha$.

The analogs discussed to this point have been limited to a single recorded seismic trace. However, a further object of this invention is to achieve a multi-channel analog with the same accuracy of the single channel analog. This is accomplished according to our invention by instrumenting a multiplicity of mechanical analogs using a common $t_n$ dimension and a multiplicity of $t_h$ dimensions. Since the same average velocity function holds approximately for every trace, the $t_h$ function associated with the farthest seismometer station can be scaled downward for each of the other seismometer stations, thereby simplifying the problem of generating the $t_h$ motions required for the multiplicity of time triangles. FIGURE 5 illustrates a six channel time corrector developed as an extension of the single channel corrector of FIGURE 3. Six tapes 11 are attached to a common carriage 12 which is adapted to move along guide rods 17. In FIGURE 5, the corners of the six time triangle represented by the tape index pins 16 are the only corners that are not common. However, these corners are related positionally in the same way that the seismometer stations are related. So, if the index pins 16 are coupled in such a way that movement of the pin for the farthest seismometer station also moves the other pins in proportion, all the $t_h$ dimensions of each time triangle are maintained in the proper proportion, and thus all of the six time triangles are generated simultaneously with a downward motion of the tape carriage 12.

There are two basic phases of operation of the multichannel device of this invention, such as schematically illustrated in FIGURE 5. First, the seismic field data displayed are reproduced in such a manner that each trace of the seismogram is transcribed onto an individual magnetic tape of the analog corrector of this invention. Then, the data on the individual magnetic tapes are played off in such a way that the required time corrections are accomplished. To transcribe the field data onto the individual magnetic tapes of the analog device, all of the index pins 16 (which are attached to magnetic heads 14) are positioned at the initial carriage position. This means that the $t_h$ arm 18 coupled indirectly to the index pins 16 is positioned so that the $t_h$ dimension is zero. In this condition, the tape carriage is started and moves uniformly downward as each channel of seismic data is recorded on its respective tape. No change in the time alignment of reflection events is produced by the recording of the tapes in this phase.

To play back the data thus recorded on the individual magnetic tapes, the tape carriage 12 is returned to its initial starting position and the $t_h$ arm 18 is swung out to a position corresponding to the $t_h$ value desired at time zero. As the tape carriage 12 is started and moved uniformly downward, the $t_h$ arm 18 is moved in such a way that the proper value of $t_h$ is maintained at all times for all channels. When the playout made in this phase is examined, all reflection events will be time-aligned if the proper $t_h$ occurred at the reflection normal time $t_n$. It is also necessary that the plane containing the $t_n$ dimensions be set at the correct angle. If the reflections are from a subsurface horizon that has zero dip, the $t_h$ plane must be at exactly 90° with respect to the plane of travel of the tape carriage. For other than zero dip angle of the reflecting bed, the $t_h$ plane must be accordingly tilted and then the data played out to achieve the time alignment of the reflection events.

FIGURE 6 illustrates a preferred embodiment of the tape analog corrector of this invention. This device comprises, first of all, two vertical standards 21, 22 surmounted by a cross beam 23 and resting on a support base 24. Pivotally supported between standards 21, 22 at the upper ends thereof is a frame generally designated 26, which may be referred to as the $t_h$ plane or dip plane. In the preferred form shown in the drawing, this frame 26 is in the form of a trapezoid comprising base 27, sides 28, 29, and top 31. The frame 26 is pivotal about its horizontal axis and preferably braced along this axis by brace 33, the extremities of which are in the form of yokes 34, 36 for accommodating other parts of the device. The frame 26 is hung from cross beam 23 by suitable brackets 37, 38. The frame 26 can be pivoted around its horizontal axis by means of a dip adjustment knob 39. Once the appropriate dip angle is found, the frame 26 can be locked in this position by means of a lock 41, and a dip angle dial 42 used to note the appropriate dip angle.

Frame 26 is provided with a plurality of carriage rods, only one pair 43, 44 of which are shown, which run across the long dimension of the frame and normal to its axis (brace 33). Each pair of carriage rods 43, 44 supports and facilitates the movement of a magnetic head carriage, only one of which is shown and generally designated 46. The carriage 46, as shown in more detail in FIGURE 7, is provided with an index pin 16 and the position of magnetic head 47 with respect to index pin 16 can be changed by moving the magnetic head along lead screw 48 by turning knob 49, the extent of this adjustment being indicated by dials 50, 51. In this way, static corrections for elevational and weathered layer effects can be made. A magnetic tape 11 is associated with each of the magnetic head carriages 46, one extremity of the tape being attached to a tape takeup drum 13 driven by suitable spring motor 52, this latter assembly being secured by a bracket 53 to frame member 28. The magnetic tape 11 is threaded through the magnetic head carriage 46, coming in contact with magnetic head 47 and passing over a pin attached to flutter damper 54 and then over index pin 16. In a similar manner, the frame 26 can be provided with a plurality of other magnetic head carriages, one set on one side of the axis of frame 26 representing seismometers on one side of the shotpoint and the other set of magnetic head carriages on the other side of the axis representing a set of seismometers on the other side of the shotpoint. As shown in FIGURE 6, each magnetic head carriage 46 is attached to and moveable with a $t_h$ bar 18, which is pivoted on a frame member 55. The free end of the $t_h$ bar 18 is attached to a screw 56 by suitable bracket 57, this screw hereinafter called the $t_h$ screw. One extremity of the $t_h$ screw 56 is mounted in a bracket 58 and the other extremity passes through yoke 34 into a gear box generally designated 59, the operation of which will be described subsequently.

The other end of each of the magnetic tapes 11 is secured to tape carriage 12 which is disposed to move in a vertical plane passing through the axis of frame brace 33. Tape carriage 12 is provided with guides 61 on either extremity and rides along a pair of vertical guide rods 17. Adjacent the vertical plane in which the tape carriage 12 is disposed is a steel band 62 which is adapted to move continuously at a fixed rate. The steel band 62 is driven by an assembly comprising a synchronous motor 63, a viscous coupled inertial damper 64, speed reducer 66, magnetic clutch 67, bull wheel 68, and suitable rollers 69, 71 at the bottom of the belt and rollers at the top of the belt, the latter rollers not being shown in the interest of brevity. The tape carriage 12 is provided with a suitable latch 72 which is adapted to grip the steel band 62 so as to enable the carriage to be pulled downwardly by the steel band. Depending from cross beam 33 is a rod 70 which is adapted to be actuated by means 75 comprising a solenoid, rod 70 functioning to trip latch 72 when carriage 12 is in its initial or uppermost position. At the lower end of the carriage path the latch 72 is decoupled from the steel band by automatic means 73. As shown in FIGURE 7, the carriage guides 61 are preferably attached to carriage return strings 74, 76. String 74 passes upwardly through yoke 36 of FIGURE 6 and over roller 77 and is attached at its upper end to capstan 78, having two spiral grooves, which is provided with a clutch 79 and gears 80, 81 driven by motor 82. String 76 passes through yoke 34 and over roller 83 and is attached to capstan 78 at its upper end. When the carriage 12 reaches its lower extremity and is decoupled from the steel band 62, means 73 automatically activates the motor 82 in the carriage return assembly, whereupon the carriage is returned automatically to its initial position just below brace 33. Although we prefer such an automatic carriage return assembly, it is within the scope of this invention to return the carriage manually, or by any other suitable means.

Also affixed to the tape carriage 12, preferably by one of the guides 61 thereof, is a magnetic tape 84 (FIGURE 6) which serves as a reference timing tape and is used to provide timing marks on each run of the device for a check of its proper operation and timing accuracy. The upper end of this timing tape 84 is wound around a tape takeup drum 86 driven by spring motor 87, this assembly being attached by suitable bracket 88 to cross beam 23.

Disposed below frame 26 is another frame generally designated 91, shown in more detail in FIGURE 8. This frame 91 is rectangular in shape and comprises bottom 92, top 93, and sides 94, 96. Longitudinally moveable within the frame 91 is a template carriage generally designated 97 and it comprises bottom 98, top 99, sides 101, 102, and intermediate bar 103. Vertically mounted within carriage 97 below bar 103 is template (or cam) 104, hereinafter referred to as the velocity template. This template 104 is provided at its upper end with a profile surface 106. The horizontal dimension of template 104 is proportional to seismic record time, the constant of proportionality being dependent upon the dimensions of the analog device, and the vertical dimension of the template being proportional to the $t_h$ for the fastest seismometer and it is subject to the same constants of proportionality. For example, if the fastest seismometer is 1320 feet and the average velocity for zero record time is 8,000 ft./sec., $t_h$ becomes 1320/8000 multiplied by 15″/sec. (the proportional constant) or 2.47 inches. For zero record time, the vertical dimension of template is 2.47 inches. The other vertical cam dimensions are calculated in a similar fashion by using the average velocity appropriate to the record time. These calculations are plotted on a template plank and a smooth surface cut through the plotted points to provide profile surface 106. The bottom member 98 of carriage 97 is provided on one side with a longitudinal rack 107 and pinion 108 which is driven by a suitable motor 109 having magnetic clutch 111. Carriage 97 is adapted to move longitudinally within frame 91 along guide bars 112, 113. Carriage 97 is moved from its starting position, as shown in FIG- URE 8, by motor 109, and when it reaches the end of its path of travel, at a position adjacent frame member 96, it trips a limit switch 114; accordingly, motor 109 is reversed and carriage 97 returned to its starting position. When carriage 97 reaches the latter position, it trips limit switch 116, causing the clutch 111 to disengage and the reversal of motor 109.

At a point intermediate the ends of frame 91 are a pair of rods 117, 118 upon which is mounted for vertical movement a program head 119. The latter is provided with a pin 121 sticking out from one side and resting upon the profile surface 106 of template 104. When carriage 97 moves, the program head 119 is pulled down by spring motors, pin 121 in effect sliding along profile surface 106. Passing through program head 119 is a linkage tape 122 the lower end of which is wound around a takeup drum disposed within head 119. The slack in tape 122 can be taken up by a linkage adjuster 124. The tape 122 is thus, in effect, tied at one end to program head 119. The other end of tape 122 passes up through the top member 93 of frame 91 and over a pair of rollers 126, 127 and finally to a gear mechanism 59. Mechanism 59 is adapted to translate the longitudinal motion of linkage tape 122 into a rotational motion to rotate $t_h$ screw 56. Thus, as carriage 97 moves within frame 91, program head 119 falls, thereby pulling linkage tape 122 and causing the rotation of the $t_h$ screw 56. As the $t_h$ screw 56 rotates, $t_h$ bar 18 is pivoted about bracket 55, causing the various magnetic head carriages 46 to move in consort toward the pivotal axis (brace 33) of frame 26. Screw 56' is also rotated but in the opposite direction, to cause the movement of the magnetic head carriages (not shown) on the opposite side of brace 33. A suitable motor 120 is adapted to pull the program head 119 back to its starting position after a run has been made. A knob 125 and a dial 130 are associated with the upper end of tape 122; this permits adjustment of the $t_h$ arm 18 and provides a means for indicating the $t_h$ positions of the magnetic heads and the vertical position of pin 121 on profile surface 106.

In the operation of the tape analog corrector shown in FIGURES 5–8, seismic field data is first transcribed onto the individual magnetic tapes 11. This can be accomplished by using a magnetic recorder, such as Type MR-4 supplied by Southwestern Industrial Electronics Co., to play the data from one field magnetic tape (containing, for example, 24 traces) and transcribe each trace onto a corresponding magnetic tape 11. In making this transcription, all of the index pins 16 of the magnetic head carriages 46 and the tape carriage 12 are positioned at the initial carriage position (shown in FIGURE 5 by a broken line). All of the static and dynamic corrections are set at zero. With steel band 62 moving at a constant speed, solenoid 75 is energized to cause rod 70 to trip carriage latch 72. Accordingly, tape carriage 12 is fastened to steel band 62 and is moved downward therewith. Carriage 12 pulls the tapes across the magnetic heads 47, thereby recording each trace of seismic data from the field tape onto a corresponding magnetic tape 11. At the same time, carriage 12 pulls reference timing tape 84 downwardly, this tape having already recorded thereon timing marks which are used to check the operation and time accuracy of the recording later on when the transcribed data on tapes 11 are played off. No change in the time alignment of reflection events is produced by the recording of the tapes 11 in this phase of operation. When carriage 12 reaches the lower end of its path of travel, at which point all of the field data has been transcribed on tapes 11, latch 72 is automatically decoupled from steel band 62 by automatic means 73, the latter also activating the carriage return assembly shown in FIGURE 7 to return carriage 12 to its initial carriage position. Upon such return, spring motors 52 wind up the slack in tapes 11 on takeup drums 13.

The tapes 11 now have recorded thereon the seismic data corresponding to that of the field tape. Before playing back the data from tapes 11, appropriate corrections are introduced into the device so that the arrival times of the recorded reflection events are shifted into time alignment on each tape in a controlled manner. These corrections are accomplished, after making the appropriate settings, directly in the playback operation.

With tape carriage 12 in its initial position, $t_h$ arm 18 is manipulated by knob 125 (FIGURE 8) to swing the $t_h$ arm out to a position coresponding to the $t_h$ value desired at time zero. Since the $t_h$ value will be different for each seismometer on one side of the shotpoint, the relative position of each of the index pins 16 with respect to the initial carriage position (shotpoint E) will be different. As time zero, pin 121 is set at a corresponding position on the velocity profile surface 106 of template 104 (FIGURE 8), and the slack in linkage tape 122 is taken up by linkage adjuster 124, template carriage 97 being placed at its initial position adjacent frame member 94. Another correction which can be introduced before starting the playback operation is that due to static errors. Introduction of this correction is accomplished by manipulating knob 49 (FIGURE 7) to adjust the relative position of each magnetic head with respect to its index pin 16.

When said corrective settings have been introduced, solenoid 75 is actuated and clutch 111 of template carriage motor 109 is engaged, so that tape carriage 12 is started downwardly simultaneously with the lateral movement of template carriage 97 from its starting position. As tape carriage 12 moves downwardly with steel band 62, $t_h$ arm 18 is moved (as a result of the translation of the longitudinal motion of linkage tape 122 to rotational motion of $t_h$ screw 56, as pin 121 drops along profile surface 106) to introduce the proper value of $t_h$ for all tape channels. At the lower end of the path traveled by tape carriage 12, latch 72 is decoupled and the tape carriage returns to its starting position in the same manner as in the record operation. Simultaneously, template carriage 97 at the furthermost point in its lateral path trips limit switch 114, causing the reversal of motor 109, the return of the template carriage to its initial position, the return of $t_h$ bar 18 to its starting position, and the return of program head 119 to its starting position. When tape carriage 12 reaches its initial starting position, clutch 79 is disengaged, and when template carriage 97 reaches its initial starting position it trips limit switch 116 to disengage clutch 111.

During the playback operating just described, the signals from the magnetic heads 47 can be recorded on a single magnetic tape, the individual traces thereof having their reflection events in proper time alignment. Alternatively, said signals can be displayed on an oscilloscope and examined visually.

The playback operation can be repeated by changing the angle of frame 26 for each run. For example, when frame 26 is at 90° with respect to the plane of travel of tape carriage 12, the played out seismic signals are assumed to be those of subsurface horizons with zero dip. By releasing lock 41 and manipulating knob 39, the dip angle of frame 26 can be changed, after which lock 41 is again tightened to maintain the frame at the new dip angle during the next playback operation. The dip angle can be repeatedly changed, preferably every 3°, from −35° to +35°, to determine the dip angles of subsurface horizons, if they in fact exist.

In summing up, the preferred embodiment of the tape analog corrector shown in FIGURES 6–10 is provided with a plurality of channels, e.g., 24, dip angle adjustment, cam controlled $t_h$ function, individual static time adjustments for each channel, and suitable control for tape carriage start, stop, and return. This apparatus is especially suited as a rapid searching device for determining all combinations of average velocity and dip angle at which reflections exist on a field seismograph record. It can also be used in a conventional fashion as a normal moveout corrector for making record sections or special composite recordings of many descriptions.

Various modifications and alterations of this invention will become apparent to those skilled in the art without departing from the scope and spirit of this invention, and it should be understood that this invention is not to be limited to those preferred embodiments illustrated herein.

We claim:

1. An apparatus for correcting the normal moveout of a plurality of seismic traces produced by a plurality of seismometers, comprising drive means for driving a steel band at a constant velocity, frame means, a plurality of magnetic tapes containing seismic data and disposed to move in the plane of said frame means, tape carriage means adapted to move in the plane of said steel band, a plurality of magnetic head carriage means adapted to move in the plane of said frame means, each of said magnetic head carriage means comprising a magnetic head and index pin, means to couple said tape carriage to said steel band, the initial time ends of said magnetic tapes being affixed to tape take-up drums secured to said frame means, said magnetic tapes adapted to be threaded through said carriages and pivotal around said index pins, bar means for moving said magnetic head carriages in consort in proportion to their position along said bar means, and means for translating a cam-driven motion to said bar means.

2. An apparatus for simultaneously correcting the normal moveout of a plurality of seismic traces produced by a plurality of seismometers, comprising a plurality of magnetic tapes upon which can be recorded the seismic events of said seismic traces, each of said tapes comprising one element of a mechanical analog of the seismic time triangle, said triangle comprising legs $t_h$, $t_r$, and $t_n$, where leg $t_h$ is the horizontal time from shotpoint to seismometer, leg $t_r$ is the time from shot image to seismometer, and leg $t_n$ is the normal time from shotpoint to shot image, frame means pivotal about an index axis, a plurality of magnetic tape take-up drums secured to said frame means on opposite sides of said index axis, one end of each of said tapes being fastened to one of said drums, a tape carriage adapted to move in a plane oblique with respect to the plane of said frame means and coincident with the plane in which said leg $t_n$ of said time triangle is disposed, the other initial time ends of said tapes being fastened to said tape carriage means, a plurality of magnetic head carriages comprising a magnetic head and index pin, said magnetic head carriage adapted to move in said plane of said frame means and coincident with the plane in which said leg $t_h$ is disposed, the locus of said index pin corresponding to the position of the seismometer in said time triangle, said tapes being threaded through said magnetic head carriages and passing over said index pins, means for driving a steel band at a constant velocity in a plane parallel to that in which said leg $t_n$ is disposed, means to couple said tape carriage to said steel band, means for changing the tilt of said frame means, bar means for moving said magnetic head carriages in consort in proportion to their position along said bar means, and means for translating a cam-driven motion to said bar means.

3. An apparatus for simultaneously correcting the normal moveout of a plurality of seismic traces produced by a plurality of seismometers, comprising a plurality of magnetic tapes upon which can be recorded the seismic events of said seismic traces, each of said tapes comprising one element of a mechanical analog of the seismic time triangle, said triangle comprising legs $t_h$, $t_r$, and $t_n$, where leg $t_h$ is the horizontal time from shotpoint to seismometer, leg $t_r$ is the time from shot image to seismometer, and leg $t_n$ is the normal time from shotpoint to shot image, frame means pivotal about an index axis, a plurality of magnetic tape take-up drums secured to said frame means on opposite sides of said index axis, one end of each of said tapes being fastened to one of said drums, a tape carriage adapted to move in a plane oblique with respect to the plane of said frame means and coincident with the plane in which said leg $t_n$ of said time triangle is disposed, the other initial time ends of said tapes being fastened to said tape carriage means, a plurality of magnetic head carriages comprising a magnetic head and index pin, said magnetic head carriage adapted to move in said plane of said frame means and coincident with the plane in which said leg $t_h$ is disposed, the locus of said index pin corresponding to the position of the seismometer in said time triangle, said tapes being threaded through said magnetic head carriages and passing over said index pins, means for driving a steel band at a constant velocity in a plane parallel to that in which said leg $t_n$ is disposed, means to couple said tape carriage to said steel band, means for changing the tilt of said frame means, a pair of pivotal bar means affixed to said magnetic head carriages, each of such bar means being disposed on either side of said index axis and pivotal about a fixed point, said bar means being disposed in a plane parallel to that of said frame means, means for generating a longitudinal motion proportional to said leg $t_h$ and inversely proportional to the said average velocity, means for converting said longitudinal motion to a corresponding rotational motion, means for transmitting said rotational motion to a longitudinal motion to move each of said bar means about its free end, said magnetic head carriages being affixed to said bar means at loci corresponding to the leg $t_h$, and means for changing the relative positions of each of said index pins and corresponding magnetic heads by a fixed amount plus an amount proportional to the static time error for each of said traces, the dimension between each of said index pins and said tape carriage corresponding to said leg $t_r$, the dimension between each of said index pins and said index axis corresponding to said leg $t_h$, and the dimension of between said index axis and said tape carriage corresponding to said leg $t_n$ when said tape carriage is coupled to said steel band and said magnetic tapes are pulled nonuniformly across said index pins, whereby the time of transcription of seismic events will be equivalent to normal time rather than reflection time.

4. A method for correcting the normal move-out of a plurality of seismic traces produced by a plurality of seismometers, comprising the steps of transcribing said traces onto a plurality of recording media; forming a plurality of seismic time triangles with each of said plurality of recording media being that leg of said seismic time triangle representing the travel time from a shot image to each of said seismometers; passing the recording media past a plurality of transcribing stations at a nonuniform rate, said rate being inversely proportional to the average velocity between the shot image and each of said seismometers whereby the time of transcription of seismic events onto the transcribing station will be equivalent to normal time rather than reflection time.

5. A method according to claim 4 which includes the steps of locating an angle of dip for a reflecting horizon and adjusting the motion of said recording media across said transcribing stations in response to the dip angle of said reflecting horizon.

References Cited by the Examiner

UNITED STATES PATENTS

| | | | |
|---|---|---|---|
| 2,730,569 | 1/56 | Street | 179—100.2 |
| 2,732,025 | 1/56 | Lee | 181—.5 |
| 2,898,574 | 8/59 | Palmer | 340—15.5 |

SAMUEL FEINBERG, *Primary Examiner.*

CHESTER L. JUSTUS, *Examiner.*